T. J. CHURCHILL.
MACHINE FOR SOWING PARIS GREEN.
APPLICATION FILED JULY 27, 1910.
981,614.
Patented Jan. 17, 1911.
2 SHEETS—SHEET 1.
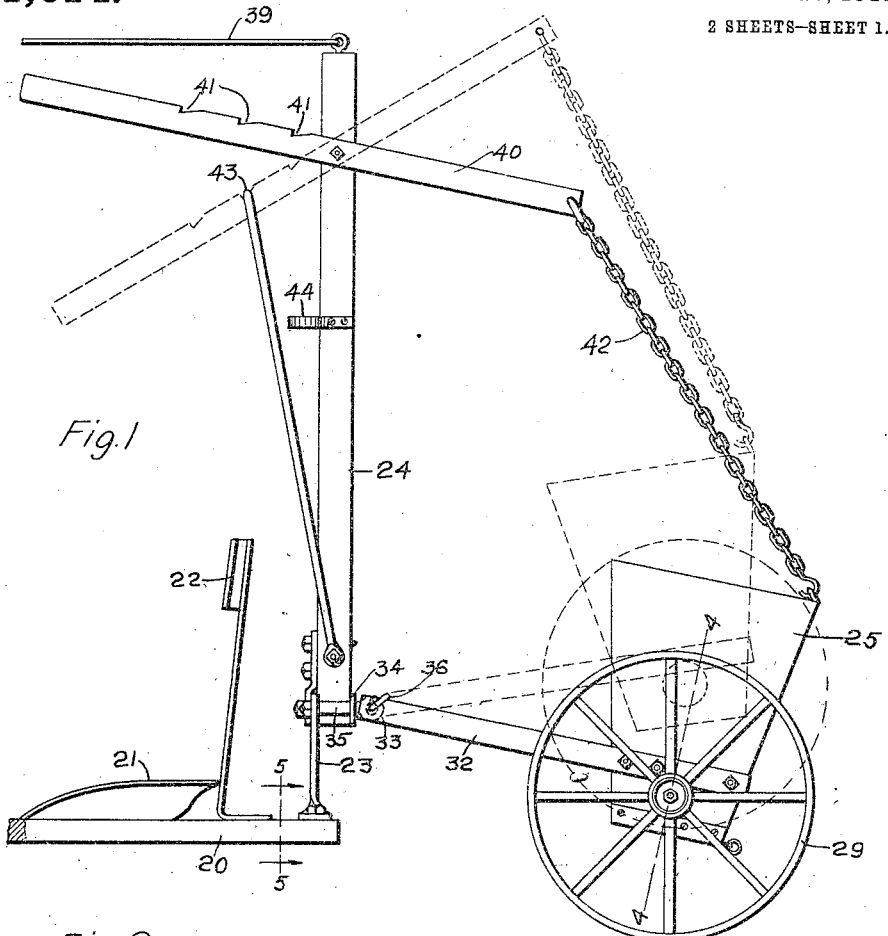
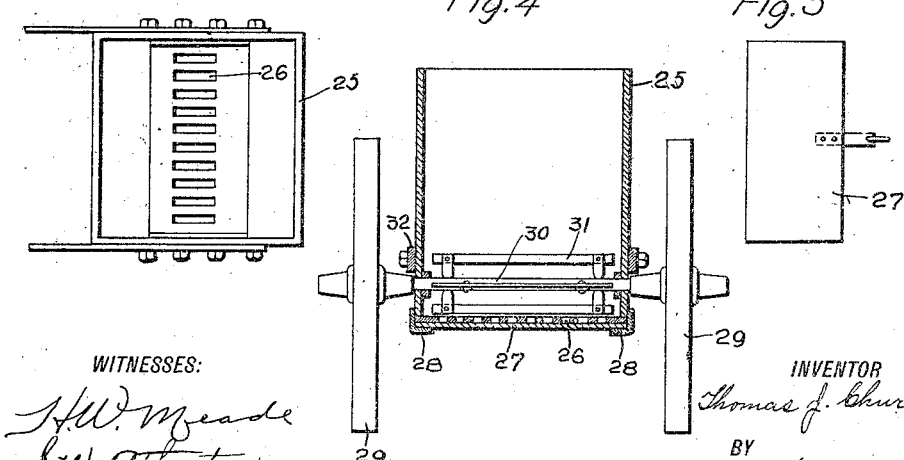
WITNESSES:
H. W. Meade
S. W. Atherton.
INVENTOR
Thomas J. Churchill
BY
A. M. Wooster
ATTORNEY

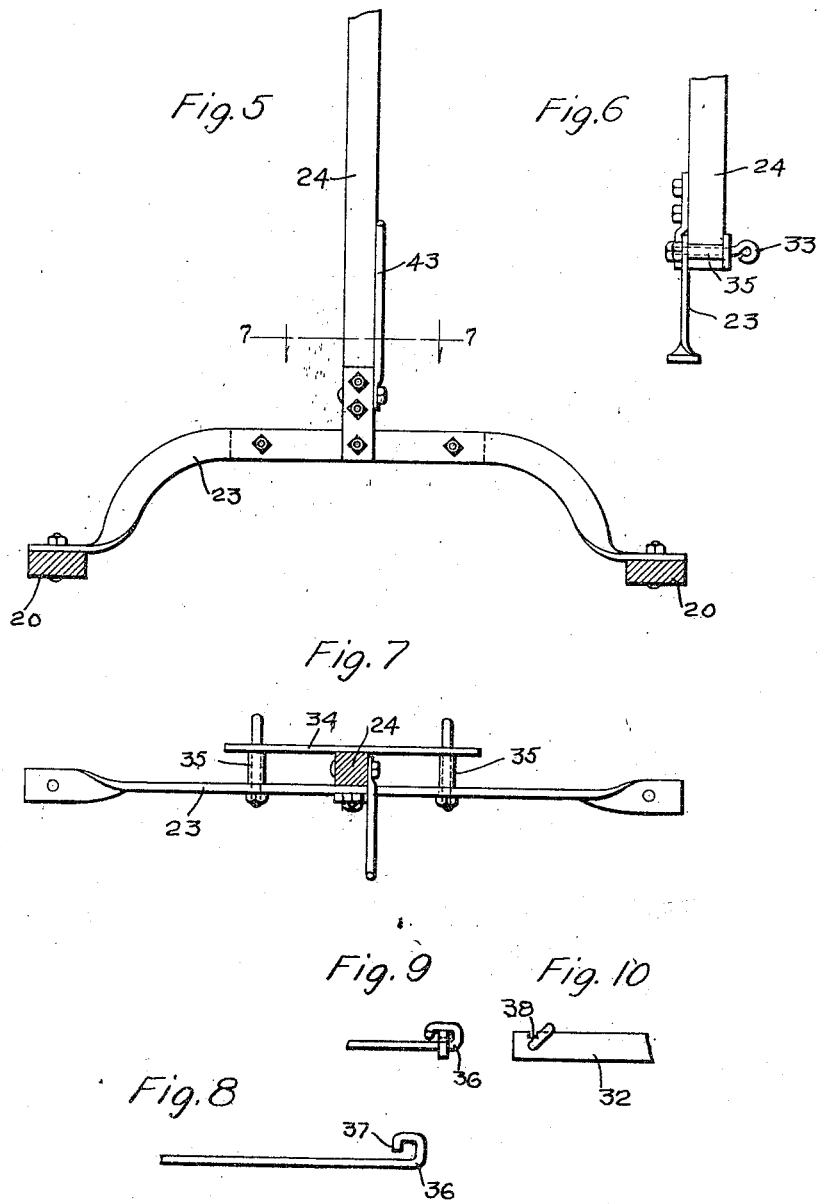

UNITED STATES PATENT OFFICE.

THOMAS J. CHURCHILL, OF BOARDMAN, CONNECTICUT.

MACHINE FOR SOWING PARIS-GREEN.

981,614.  Specification of Letters Patent.  Patented Jan. 17, 1911.

Application filed July 27, 1910.  Serial No. 574,191.

*To all whom it may concern:*

Be it known that I, THOMAS J. CHURCHILL, a citizen of the United States, residing at Boardman, county of Litchfield, State of Connecticut, have invented an Improved Machine for Sowing Paris-Green, of which the following is a specification.

This invention has for its object to provide a machine for sowing paris green, which may be attached to ordinary seeding and planting machines, as for example tobacco planting machines, and which may be lifted clear of the ground by an operator on the seeding or planting machine to permit the paris green sowing machine to be turned with the other machine at the ends of rows and then lowered to place, the construction being such that paris green will only be delivered when the wheels are rotating.

With this and other objects in view I have devised the novel mechanism which I will now describe referring to the accompanying drawings forming a part of this specification and using reference characters to indicate the several parts.

Figure 1 is an elevation showing the attachment of my novel machine to a seeding or planting machine; Fig. 2 a plan view of the body or hopper detached; Fig. 3 a view of the cut-off slide detached; Fig. 4 a section on the line 4—4 in Fig. 1; Fig. 5 a section on the line 5—5 in Fig. 1, looking in the direction of the arrows and showing the standard in elevation; Fig. 6 a detail view corresponding with Fig. 1, the shaft being removed; Fig. 7 a section of the standard on the line 7—7 in Fig. 5, showing the cross piece in plan; and Figs. 8, 9 and 10 are detail views illustrating the connection of the shafts of the paris green sowing machine to the cross piece.

For convenience in description I will use the word "machine" to designate the present invention and will refer to the seeding or planting machine to which it is attached as the "planter".

20 denotes the frame of a planter, 21 the rear seat and 22 the back therefor. These parts may be of any ordinary or preferred construction and are not of my invention.

23 denotes a cross piece rigidly secured to the frame, and 24 a standard rigidly secured to the cross piece.

25 denotes the body or hopper of my novel machine which is preferably provided with vertical sides and downwardly and inwardly inclined ends. The bottom is provided with longitudinal slots 26 through which the paris green is distributed, the amount that is delivered being regulated by a cut off slide 27 lying under the bottom and sliding in ways 28. Movement of the slide backward or forward acts to cut off the passage of paris green or to regulate the delivery as may be required. The wheels 29 are rigidly secured to an axle 30 which is journaled in the sides of the body at sufficient distance above the bottom to provide for an agitator 31 which is carried by the axle and the arms of which just clear the bottom. In practice the paris green in the body or hopper will compact together sufficiently so that it will not pass through the slots to any appreciable extent except when it is stirred by the agitator.

32 denotes the shafts of the machine which are rigidly secured to the sides of the body, extend forward and are connected to the cross piece. The special mode of connecting the shaft to the cross piece is immaterial so far as the principle of the invention is concerned. In the drawings I have shown eye bolts 33 engaging the cross piece and a plate 34, sleeves 35 on the bolts bearing against the cross piece and the plate and retaining the parts rigidly in place when the nuts are tightened up. A locking pin 36 passes through the shafts and the eyes of the bolts to lock the shafts to the cross piece. This pin is provided with a head having a stop lug 37 by which it is removably retained in place. The upper side of one of the shafts is provided with a notch 38 which permits the stop lug to pass when the head is in an upright position. After the locking pin is inserted the head is allowed to swing laterally as in Figs. 1 to 10, and the stop lug, by engagement with the side of the shaft, will retain the pin against removal until the head is raised to an upright position.

The upper end of the standard is steadied by means of a rod 39 rigidly connected to the standard and to a fixed portion of the machine, the forward attachment of said rod not being shown.

40 denotes a lever pivoted near the upper end of the standard and provided with notches 41. A chain 42 connects the rear end of the lever with the rear end of the body or hopper of the machine.

43 denotes a retaining hook having an elongated shank which is pivoted to the standard. This hook is adapted to engage either of the notches in the lever.

The normal position of the lever, that is when the machine is in use, is shown in full lines in Fig. 1. At the end of a row where it is required to turn the machine the operator pulls down the lever, as indicated by dotted lines, and engages the hook therewith to retain it in that position. This tilting movement of the lever, by means of the chain, lifts the machine clear from the ground so that the wheels and the agitator stop rotating and the delivery of paris green is stopped. The planter may then be turned and the machine will be turned with it. As soon as the planter and the machine are again in operative position the hook is detached from the lever and the machine is lowered to the ground as in Fig. 1. As soon as the planter starts again the wheels of the machine will of course rotate and the agitator will cause the delivery of paris green as before.

Should it be required at any time, the delivery of paris green, when the wheels and agitator are rotating, may be cut off by means of slide 27 which may also be used to regulate the quantity of paris green that is delivered.

A suitable catch 44 is provided on the standard to engage the shank of the retaining hook and secure it to the standard when not in use.

Having thus described my invention I claim:

1. A machine of the character described comprising a cross piece adapted for attachment to a planter, a standard secured to the cross piece, a lever pivoted thereto, a paris green sowing machine connected to the cross piece and to the lever, said lever being adapted to lift the machine from the ground, and means for locking the lever in the lifting position.

2. A machine of the character described comprising a cross piece and standard, a paris green sowing machine connected thereto, a lever pivoted to the standard, a connection between the lever and the machine, said lever being adapted to lift the machine from the ground and means for retaining the lever in the lifting position.

3. A machine of the character described comprising a cross piece and standard, a paris green sowing machine connected thereto, a lever pivoted to the standard, a connection between the lever and the machine, said lever being adapted to lift the machine from the ground, a hook adapted to engage the lever for the purpose set forth and having a shank pivoted to the standard and a catch on the standard for holding the hook out of operative position.

4. The combination with a standard and cross piece, a notched lever pivoted to the standard and a hook pivoted to the standard and adapted to engage one of said notches for the purpose set forth, of a paris green sowing machine having shafts, means for detachably connecting the shafts to the cross piece and a connection between the lever and the machine.

5. The combination with a standard and cross piece and eye bolts in the cross piece, of a paris green sowing machine having shafts, a locking pin passing through the shafts and the eye bolts and having a head adapted to engage a shaft to retain the pin in the locking position and means for lifting the machine from the ground and retaining it out of contact therewith.

6. The combination with a standard and cross piece and a paris green sowing machine having shafts detachably connected to the cross piece, of a lever pivoted to the standard and a chain connecting one end of the lever with the rear end of the machine and a hook pivoted to the standard and adapted to engage the lever when it is tilted to lift the machine from the ground.

In testimony whereof I affix my signature in presence of two witnesses.

THOMAS J. CHURCHILL.

Witnesses:
LAURENCE J. MARMION,
JOSEPH M. MCDONNELL.